(12) United States Patent
Zhou

(10) Patent No.: US 11,786,092 B2
(45) Date of Patent: Oct. 17, 2023

(54) ELECTRIC CLEANING DEVICE

(71) Applicant: Yong Zhou, Yongzhou (CN)

(72) Inventor: Yong Zhou, Yongzhou (CN)

(*) Notice: Subject to any disclaimer, the term of this patent is extended or adjusted under 35 U.S.C. 154(b) by 0 days.

(21) Appl. No.: 17/512,520

(22) Filed: Oct. 27, 2021

(65) Prior Publication Data

US 2023/0080846 A1 Mar. 16, 2023

(51) Int. Cl.
*A47L 9/04* (2006.01)
*A47L 5/38* (2006.01)

(52) U.S. Cl.
CPC .............. *A47L 9/0411* (2013.01); *A47L 5/38* (2013.01); *A47L 9/0455* (2013.01); *A47L 9/0477* (2013.01)

(58) Field of Classification Search
CPC ........ A47L 5/38; A47L 11/185; A47L 9/0411; A47L 9/0455; A47L 9/0477; A47L 9/0427; A47L 7/009
USPC ................................................ 15/389
See application file for complete search history.

(56) References Cited

U.S. PATENT DOCUMENTS

| | | | | |
|---|---|---|---|---|
| 4,875,246 A * | 10/1989 | MacGregor | ........... | A47L 13/144 15/98 |
| 6,134,745 A * | 10/2000 | Worwag | .................... | A47L 9/32 15/368 |
| 7,022,003 B1 * | 4/2006 | Hughes | ............... | A47L 11/4069 451/352 |
| 8,069,530 B2 * | 12/2011 | Alton | ..................... | A46B 13/02 15/389 |
| 2002/0079761 A1 * | 6/2002 | Nishimura | ........... | A47L 9/2889 310/75 R |
| 2008/0223407 A1 * | 9/2008 | Smith | ................... | A47L 9/0427 134/21 |
| 2009/0089958 A1 * | 4/2009 | Dant | ..................... | A47L 9/0427 15/332 |
| 2013/0205539 A1 * | 8/2013 | Dyson | .................. | A47L 9/0455 15/389 |
| 2015/0265116 A1 * | 9/2015 | Genn | ........................ | A47L 9/02 15/389 |
| 2016/0058258 A1 * | 3/2016 | Isley | ....................... | A47L 11/19 15/50.1 |
| 2016/0183749 A1 * | 6/2016 | Isley | ..................... | A46B 13/00 15/21.1 |
| 2017/0127895 A1 * | 5/2017 | Isley | ..................... | A47L 9/0411 |
| 2018/0206685 A1 * | 7/2018 | Li | ........................ | A47L 11/4044 |
| 2018/0303304 A1 * | 10/2018 | Yang | ..................... | A47L 9/0411 |

* cited by examiner

*Primary Examiner* — Brian D Keller
*Assistant Examiner* — Tim Brady

(57) ABSTRACT

An electric cleaning device includes a housing, a cleaning roller and a driving assembly. The housing includes a cleaning chamber and the cleaning chamber defines an opening at bottom. The cleaning roller is arranged at the opening and defines a first accommodating space. The driving assembly is arranged in the first accommodating space and configured to drive the cleaning roller to rotate.

12 Claims, 6 Drawing Sheets

ELECTRIC CLEANING DEVICE

CROSS-REFERENCE TO RELATED APPLICATIONS

This patent application claims priority to Chinese patent application 202122229754.2, filed on Sep. 14, 2021, which is incorporated herein by reference in its entirety and which claims the priority benefit thereof.

FIELD OF THE INVENTION

The present invention generally relates to cleaning appliances, and more particularly relates to an electric cleaning device.

BACKGROUND OF THE INVENTION

With improvement of people's living quality, an electric cleaning device, as a cleaning tool, has attracted attention of consumers. However, existing electric cleaning devices cannot fit to the wall when cleaning corners and other scenes due to thick side walls of shells of the existing electric cleaning devices. There are large dead corners in cleaning, which cannot achieve good cleaning effect. Moreover, the existing electric cleaning device is difficult to provide a relatively sealed chamber to accommodate a motor. A chamber accommodating the motor is easy to allow water in to stain the motor and it is not convenient to clean the motor. Therefore, it is easy to cause stains to remain on the motor, which can breed a large number of bacteria and emit stench. Therefore, there is an urgent desire for an electric cleaning device which can not only minimize dead corners, but also is convenient to be cleaned, thereby avoiding stains remained on the motor and breeding of bacteria and achieving self-cleaning of the electric cleaning device.

SUMMARY OF THE INVENTION

In order to solve the afore-mentioned technology problems, the present disclosure provides an electric cleaning device, which can minimize dead corners and protect the motor from water.

An electric cleaning device includes a housing, a cleaning roller and a driving assembly. The housing includes a cleaning chamber and the cleaning chamber defines an opening at bottom. The cleaning roller is arranged at the opening The cleaning roller defines a first accommodating space. The driving assembly is arranged in the first accommodating space and configured to drive the cleaning roller to rotate.

In at least one embodiment, the driving assembly includes a fixing end and an output shaft, the fixing end is connected to a first sidewall of the housing adjacent to the opening to form a first supporting point, and the output shaft is rotatably connected to a second sidewall of the housing adjacent to the opening to form a second supporting point, so as to support the driving assembly in the first accommodating space, a gap is defined between the driving assembly and an inner wall surrounding the first accommodating space.

In at least one embodiment, the first accommodating space is arranged along an axial direction of the cleaning roller, the output shaft of the driving assembly extends along the axial direction of the cleaning roller and is connected to the cleaning roller.

In at least one embodiment, two opposite ends of the cleaning roller are connected to a first turnable and a second turnable respectively, the first turnable is rotatably connected to the first sidewall, and the second turnable is rotatably connected to the second sidewall, the output shaft of the driving assembly is connected to the second turnable.

In at least one embodiment, the first turnable defines a first limiting slot, and the second turnable defines a second limiting slot, one end of the cleaning roller is engaged in the first limiting slot, and the other end of the cleaning roller is engaged in the second limiting slot.

In at least one embodiment, the first side wall is provided with a circular bump, the fixing end of the driving assembly is connected on the circular bump.

In at least one embodiment, the first turnable is rotatably connected to the circular bump.

In at least one embodiment, the electric cleaning device further includes a first bearing. The first turnable is rotatably connected to an outer side of the first bearing, an inner side of the first bearing is sleeved on the circular bump.

In at least one embodiment, the driving assembly further includes a motor and a first shell, the motor is arranged inside the first shell, the first shell is fixed on the circular bump, two opposite ends of the motor are provided with at least two sealing plugs respectively, the first shell together with the sealing plugs forms a second sealed accommodating space configured to receive the motor.

In at least one embodiment, the at least two seal plugs includes a first sealing plug and a second sealing plug, the first sealing plug is provided with a connecting port communicated with a connecting pipe, the connecting pipe extends to an outside of the housing, the motor is connected to an external power supply through the connecting pipe, the second sealing plug is provided with a through hole, through which an output shaft of the motor extends out of the first shell to connect the output shaft.

In at least one embodiment, the connecting pipe extends through the circular bump.

In at least one embodiment, the output shaft includes a transmission shaft and a second bearing sleeved on the transmission shaft, an outer side of the second bearing is connected to the first shell, one end of the second turnable adjacent to the motor is connected to the transmission shaft so that rotation of the transmission shaft can bring the second turnable to rotate.

In at least one embodiment, the other end of the second turnable away from the motor is provided with a third bearing, an inner side of the third bearing is connected to the second turnable, and an outer side of the third bearing is connected to the housing.

In at least one embodiment, the cleaning roller includes an inner roller and scouring sponge covered on the inner roller.

In at least one embodiment, the electric cleaning device further includes a cleaning pipe and a metal piece arranged inside the cleaning chamber. The metal piece is arranged at a top of the cleaning pipe and configured to squeeze the scouring sponge.

In at least one embodiment, the electric cleaning device further includes a water inlet device arranged above the metal piece and configured to output water to wet the scouring sponge.

In at least one embodiment, the electric cleaning device further includes a connecting part arranged at an outlet of the cleaning pipe and configured to connect an external suction device.

In at least one embodiment, the electric cleaning device further includes wheels arranged at a bottom of the housing.

Through the electric cleaning device of the present disclosure, the driving assembly is arranged inside the first accommodating space, which can save space of the housing and helps to minimize a size of the housing so as to minimize dead corners when in use. Additionally, the motor is sealed inside the first shell, which can prevent water or other liquid from entering the first shell to stain the motor, thereby keeping the motor clean and waterproof. It is convenient for cleaning the electric cleaning device by water to keep the electric cleaning device clean, so as to avoiding stains remained on the electric cleaning device and breeding of bacteria and achieving self-cleaning of the electric cleaning device.

BRIEF DESCRIPTIONS OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE ILLUSTRATED EMBODIMENTS

Figure 1:
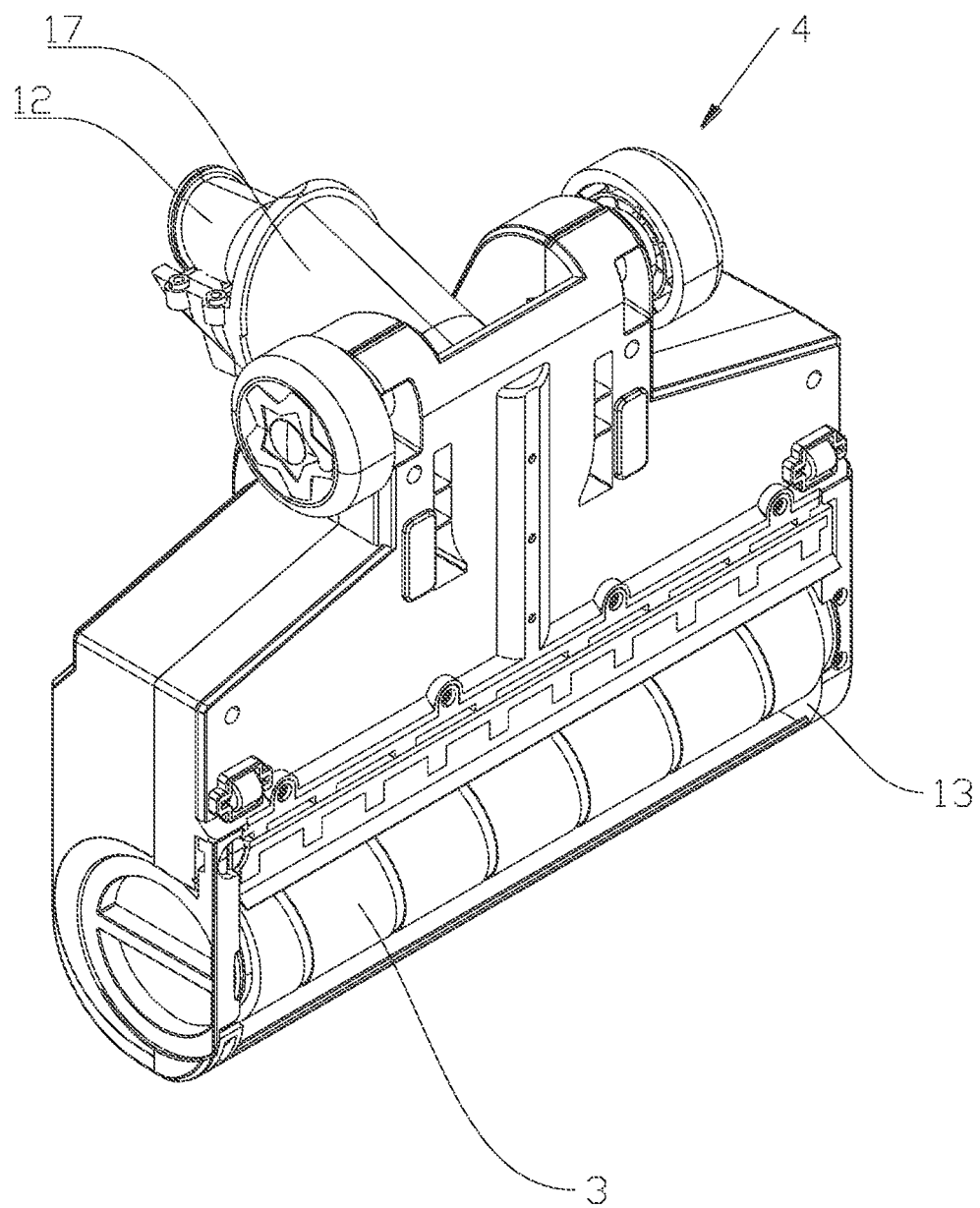
FIG. 1 is a schematic view of an electric cleaning device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
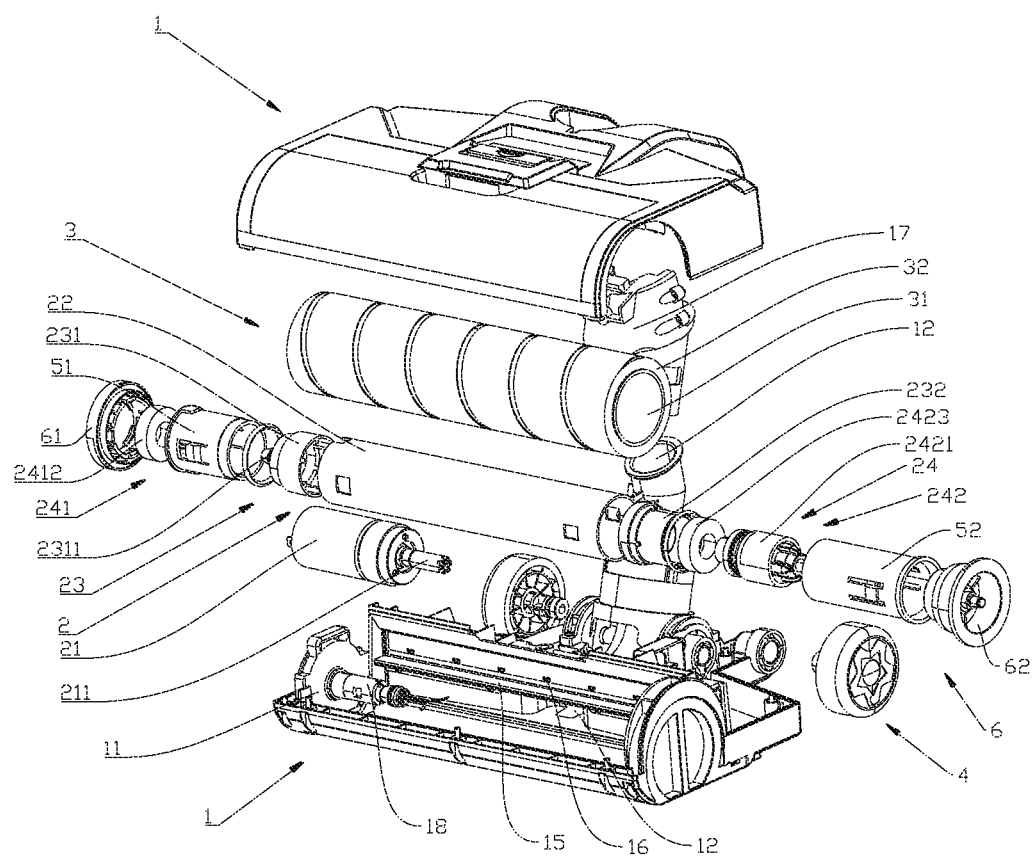
FIG. 2 is an exploded view of the electric cleaning device of FIG. 1.
Figure 3:
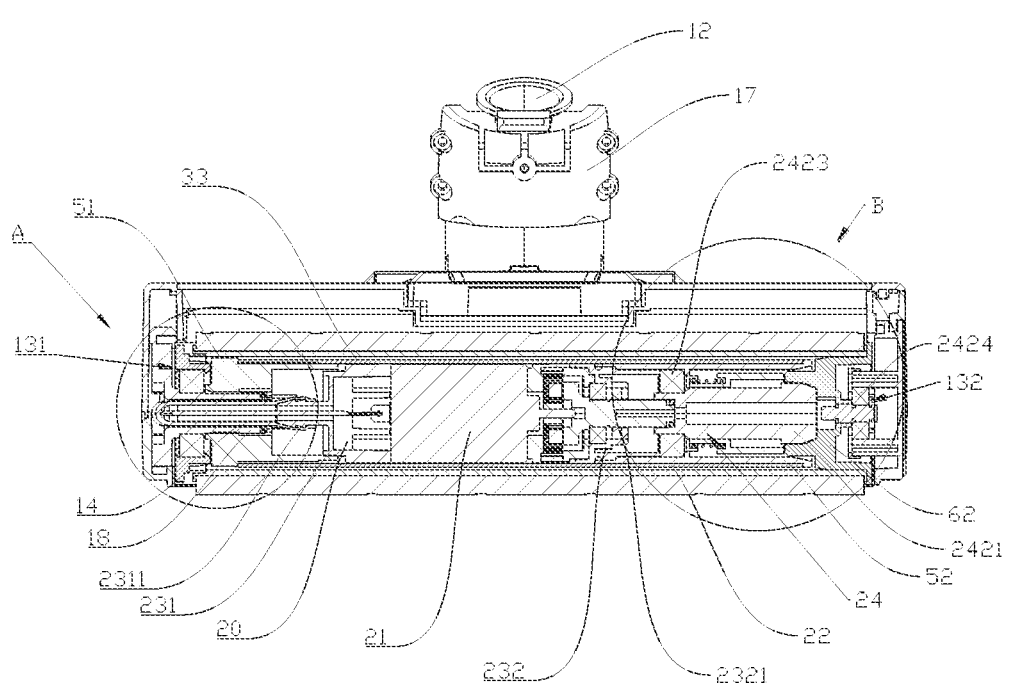
FIG. 3 is a cross-sectional view of the electric cleaning device according to an embodiment of the present disclosure, cutting along the cleaning roller.
Figure 4:
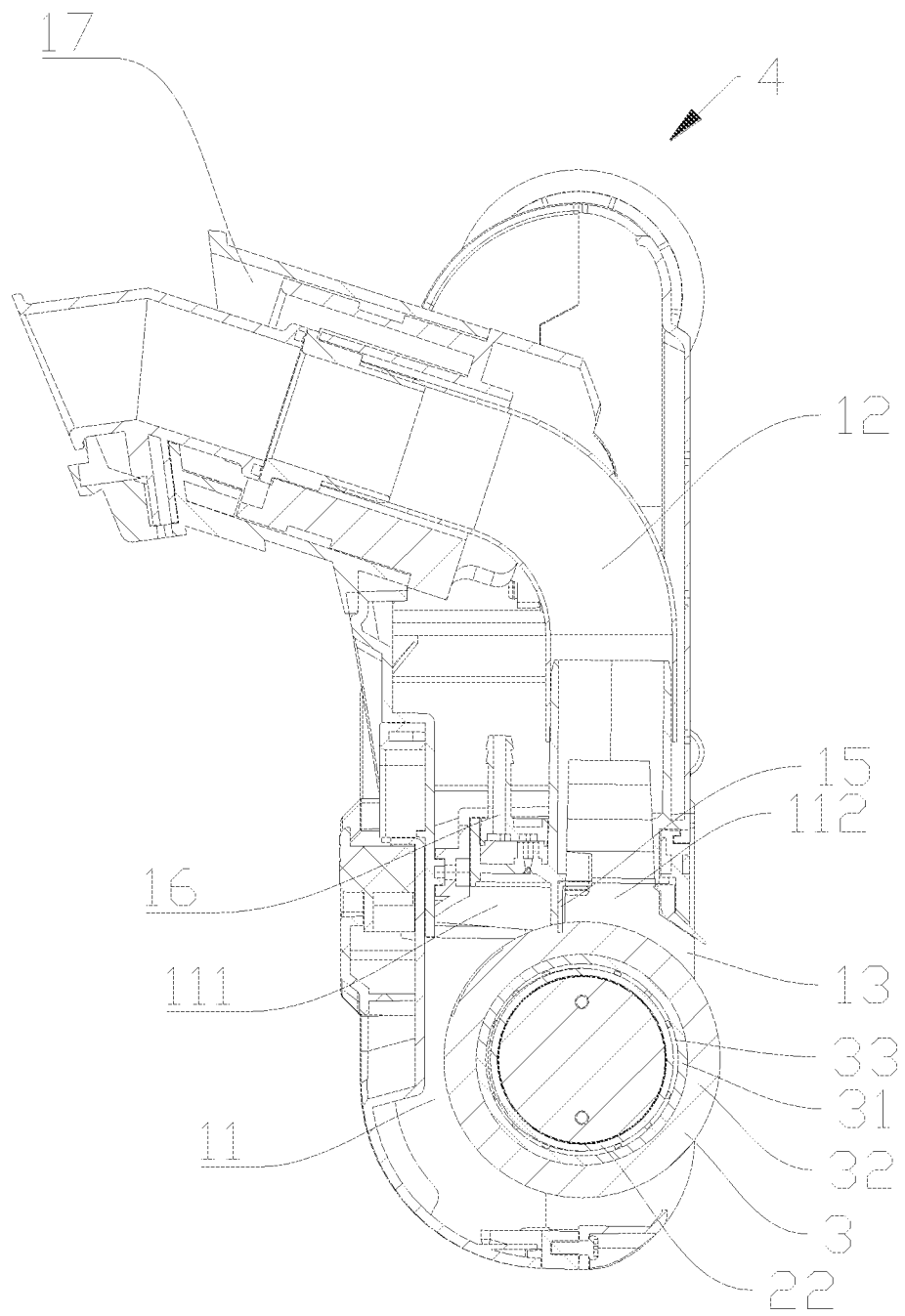
FIG. 4 is a cross-sectional view of the electric cleaning device according to an embodiment of the present disclosure, cutting along the cleaning pipe.
Figure 5:
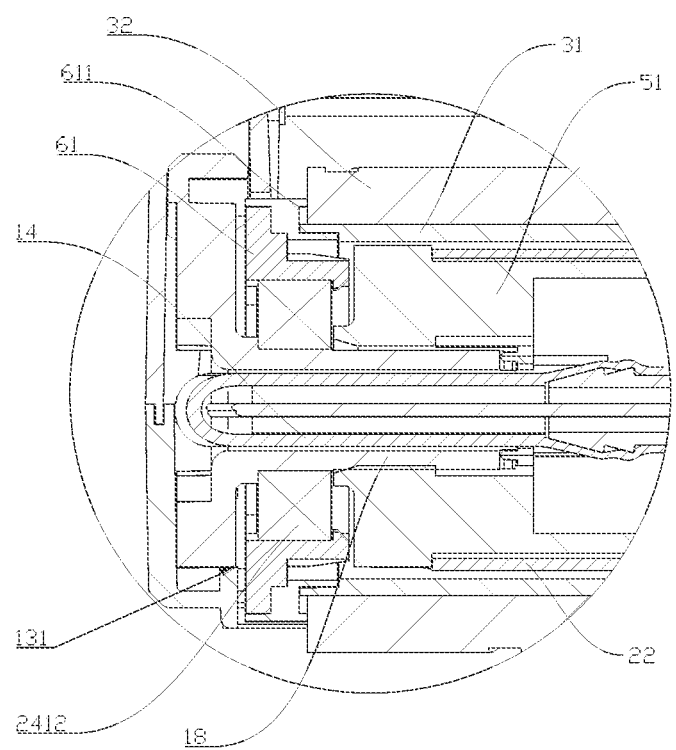
FIG. 5 is an enlarged view of the section A indicated in FIG. 3.
Figure 6:
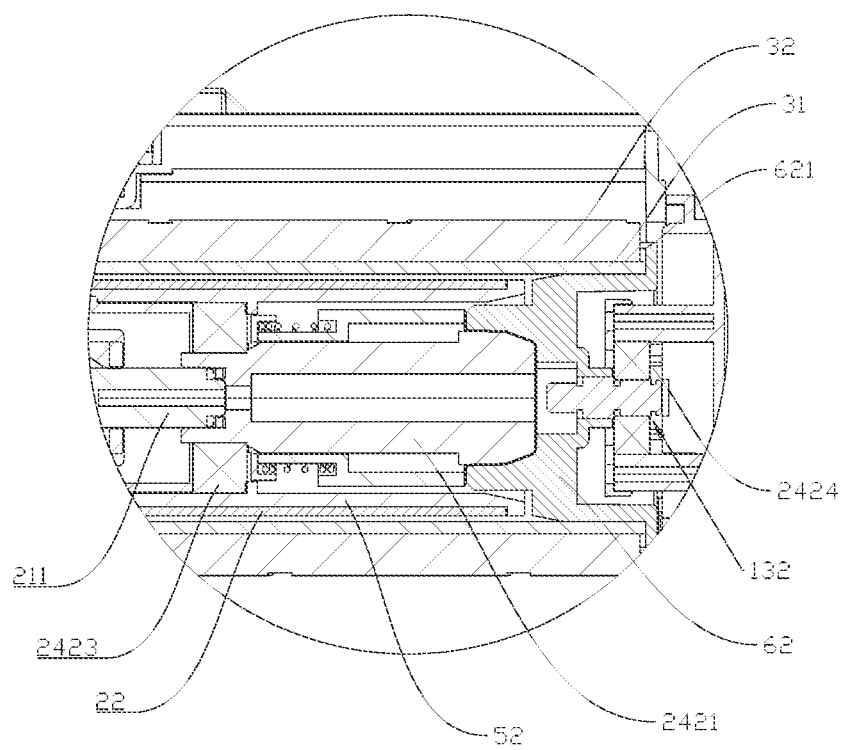
FIG. 6 is an enlarged view of the section B indicated in FIG. 3.

Referring to FIGS. 1-6, an electric cleaning device includes a housing 1. The housing 1 includes a cleaning chamber 11. The cleaning chamber defines an opening 13. A cleaning roller 3 is arranged at the opening 13 and defines a first accommodating space 33. A driving assembly 2 including a motor 21 is arranged in the first accommodating space 33 and configured to drive the cleaning roller 3 to rotate. Through above-mentioned structures, the motor 21 is sealed inside the cleaning roller 3, which can avoid arranging transmission mechanism in the housing 11. Therefore, the electric cleaning device can have a relative smaller sidewall, which helps to minimize dead corners. In addition, the motor 21 is protected from water, which is convenient for cleaning the electric cleaning device and avoid stains remained on the motor 21 and breeding of bacteria and keeping the electric cleaning device clean.

In at least one embodiment, the driving assembly 2 further includes a fixing end 20, a first shell 22 and an output shaft 24. The fixing end 20 is connected with a first sidewall 131 surrounding the opening 13. The first accommodating space 33 is arranged along an axial direction of the cleaning roller 3. The output shaft 24 extends along the axial direction of the cleaning roller 3 and is connected with the cleaning roller 3. The fixing end 20 of the driving assembly 2 is connected with the first sidewall 131 to form a first supporting point. The output shaft 24 of the driving assembly 2 is provided with a second turnable 62, the turnable 62 is connected with the cleaning roller 3 and is rotatably connected to a second sidewall 132 around the opening 13 to form a second supporting point, so as to support the driving assembly 2 in the first accommodating space 33. A gap is defined between the driving assembly 2 and an inner wall around the opening 33. Through above structures, the driving assembly 2 is supported at the opening 13 through the first supporting point and the second supporting point. The fixing end of the driving assembly 2 is connected to the first sidewall 131 of the housing 1. The driving assembly 2 is provided with a first turnable 61 and the second turnable 62 at two opposite ends thereof. An outer diameter of the first turnable 61 and the second turnable 62 is greater than that of the driving assembly 2. The cleaning roller 3 is sleeves on the driving assembly 2 and is connected between the first turnable 61 and the second turnable 62. The driving assembly 2 is configured to drive the second turnable 62 to rotate so as to bring the cleaning roller 3 to rotate.

In at least one embodiment, the first sidewall 131 is provided with circular bump 18, and the fixing end 20 of the driving assembly 2 is connected at the circular bump 18. The first shell 22 of the driving assembly 2 is connected at the circular bump 18. A connecting pipe 14 extends through the circular bump 18 and configured to allow lines to pass therethrough to connect the motor 21 and power supply. The first turnable 61 sleeves on the circular bump 18. In this way, the first shell 22 can be fixed and the first turnable 61 between the first sidewall 131 and the first shell 22 can rotate freely. It is simple in structure.

In at least one embodiment, the fixing end 20 of the driving assembly is fixed on the circular bump 18. The output shaft 24 of the driving assembly 2 is rotatably supported at the second sidewall 132 around the opening 13. The circular bump 18 is provided with a first turnable 61. The first turnable 61 defines a first limiting slot 611. The second turnable 62 is arranged at the output shaft 24. The second turnable 62 defines a second limiting slot 621. One end of the cleaning roller 3 is engaged in the first limiting slot 611, and the other end of the cleaning roller 3 is engaged in the second limiting slot 621. Through above structures, the first turnable 61 and the second turnable 62 are arranged at two opposite sides of the driving assembly 2. The first turnable 61 and the second turnable 62 can rotate freely. The cleaning roller 3 is engaged in the first limiting slot 611 of the first turnable 61 and the second limiting slot 621 of the second turnable 62. There is gap exist between the inner wall of the cleaning roller 3 and the driving assembly 2. The driving assembly 2 drives the second turnable 62 to rotate so as to bring the cleaning roller 3 to rotate.

In at least one embodiment, the first turnable 61 is provided with a first bearing 2412. An outer side of the first bearing is connected with the first turnable 61, and an inner side of the first bearing sleeves on the circular bump 18. The output shaft 24 includes transmission shaft 2421 and a second bearing 2423 sleeved on the transmission shaft 2421. An outer side of the second bearing 2423 is connected to the first shell 22. One end of the second turnable 62 is connected to the transmission shaft 2421, and the other end of the second turnable 62 is provided with a third bearing 2424. The other end of the second turnable 62 is connected to an inner side of the third bearing 2424. An outer side of the third bearing 2424 is connected to the housing 1. Through above structures, the first turnable 61 is rotatably connected to the housing 1 through the first bearing 2412. The second turnable 62 is connected on the transmission shaft 2421. One end of the transmission shaft 2421 is connected to the first shell 22 through the second bearing 2423, and the other end of the transmission shaft 2421 is connected to the housing 1 through the third bearing 2424. The motor 21 is configured to drive the transmission shaft 2421 to rotate freely so as to drive the second turnable 62 to rotate. The cleaning roller 2 is engaged between the first turnable 61 and the second turnable 62. Rotation of the second turnable 62 can bring the cleaning roller 3 to rotate, therefore, the motor 21 can drive the cleaning roller 3 to rotate.

In at least one embodiment, the driving assembly 2 includes the motor 21. The motor 20 is connected inside the first shell 22. The first shell 22 is fixed on the circular bump 18. Two opposite ends of the motor 21 is provided with a sealing plug 23. The first shell 22 together with the sealing plug 23 to form a sealed second accommodating space 20. The motor 21 is sealed inside the second accommodating space. Through above structures, the first shell 22 is arranged inside the housing 1. The motor 21 is arranged inside the first shell 22, so as to mount the motor inside the housing 1. The first shell 22 together with the sealing plug 23 to form the sealed second accommodating space 20 for receiving the motor 21, which can effectively prevent water or other liquid from entering the housing to damage the motor 21. The cleaning device can be cleaned easily to keep it clean.

In at least one embodiment, the sealing plug 23 includes a first sealing plug 231 and a second sealing plug 232. The first sealing plug 231 is provided with a connecting port 2311 connected with the connecting pipe 14. The connecting pipe 14 extends to an outside of the housing 1, so that the motor 21 can be connected to outer power supply through the connecting pipe 14. The second sealing plug 232 is provided with a through hole 2321, through which a motor shaft 211 of the motor 21 extends to be connected to the output shaft 24. Through above structures, the connecting pipe 14 is connected with the connecting port 2311 of the first sealing plug 231, which keeps the motor 21 connected to the outer power supply in a sealed environment. The motor shaft 211 of the motor 21 extends through the through hole 2321 to be connected with the output shaft 24. A sealing ring can be provided at the through hole 2321 and sleeved on the motor shaft 211 of the motor 21. Therefore, the second sealing plug 231 can keep the motor 21 works in a sealed environment, and the motor 21 can drive the output shaft 24 to rotate in the sealed environment. Therefore, it can achieve better waterproof effect of the motor through simple structures. The cleaning device can be cleaned with water, which is convenient to keep the electric cleaning device itself clean.

In at least one embodiment, the cleaning roller 3 includes an inner roller 31 and scouring sponge 32 covered on the inner roller 31. The cleaning chamber 11 is provided with a cleaning pipe 12 and a metal piece 15. The metal piece 15 is arranged on an upper side of the cleaning pipe 12. The metal piece 15 is contact with the scouring sponge 32. The cleaning chamber 11 is further provided with a water inlet device 16 arranged on an upper side of the metal piece 15. Through above structures, the cleaning roller 3 includes the inner roller 31 and the scouring sponge 32 on the inner roller 31. The scouring sponge 32 is soft and absorbent, which can achieve good cleaning effect. The inner roller 31 is hard enough to keep the shape of the cleaning roller 3, so that the scouring sponge 32 does not deform when working. The scouring sponge 32 can be replaced.

In at least one embodiment, the electric cleaning device of the present disclosure can be used with an electric cleaning machine. The electric cleaning machine can provide power to the electric cleaning device. The electric cleaning machine is provided with a suction device. The suction device is configured to be connected with the cleaning pipe of the electric cleaning device to suck waste water in the cleaning chamber. The metal piece 15 is contact with the cleaning roller 3 to squeeze the scouring sponge 32. The metal piece 15 together with the cleaning roller 3 to divide the cleaning chamber 11 into an upper cleaning chamber 111 and a lower cleaning chamber 112. The water inlet device 16 is arranged at the upper side of the metal piece 15. When the cleaning roller 3 rotates, it passes through the metal piece 15, the water inlet device 16, the opening 13, and the metal piece 15 in turn. The scouring sponge 32 is wetted by water from the water inlet device 16, and then rotates to the opening 13 to clean the ground. The water in the scouring sponge 32 turned into waste water.

When the scouring sponge 32 rotates to the metal piece 15, the metal piece 15 squeeze the scouring sponge 32 to make the waste water drop down in the lower cleaning chamber 112. The suction device sucks the waste water through the cleaning pipe 12. If the dirt to be cleaned is liquid, the water inlet device 16 can be closed. The scouring sponge 32 sucks the liquid at the opening 13 and then rotates to the metal piece 15. The metal piece 15 squeezes the scouring sponge 32 to have the liquid drop down to the cleaning chamber 11. The suction device sucks the liquid through the cleaning pipe 12. Through the metal piece 15 and the water inlet device 16, it is easy to clean the ground and is easy to clean the electric cleaning device by itself.

In at least one embodiment, the cleaning pipe 12 can be provided with a connecting part 17 configured to connect the suction device. The housing 1 can be provided with wheels at a bottom side thereof. Through above structures, the electric cleaning device of the present disclosure can cooperate with the electric cleaning machine. The electric cleaning machine can provide power to the electric cleaning device. The electric cleaning machine is provided with the suction device configured to connect the cleaning pipe to suck waste water in the cleaning chamber. The wheels at the bottom side of the housing 1 can reduce friction between the housing 1 and the ground, which helps the electric cleaning device moves smoothly on the ground to clean different areas.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. An electric cleaning device, comprising:
   a housing, wherein the housing comprises a cleaning chamber and the cleaning chamber defines an opening at bottom;
   a cleaning roller arranged at the opening, wherein the cleaning roller defines a first accommodating space; and
   a driving assembly, arranged in the first accommodating space and configured to drive the cleaning roller to rotate;
   wherein the driving assembly comprises a fixing end and an output shaft, the fixing end is connected to a first sidewall of the housing adjacent to the opening to form a first supporting point, and the output shaft is rotatably connected to a second sidewall of the housing adjacent to the opening to form a second supporting point, so as to support the driving assembly in the first accommodating space, a gap is defined between the driving assembly and an inner wall surrounding the first accommodating space, two opposite ends of the cleaning roller are connected to a first turnable and a second turnable respectively, the first turnable is rotatably connected to the first sidewall, and the second turnable is rotatably connected to the second sidewall, the output shaft of the driving assembly is connected to the second turnable; the output shaft comprises a transmission shaft and a second bearing sleeved on the transmission shaft, an outer side of the second bearing is connected to the first shell, one end of the second turnable adjacent to the motor is connected to the transmission shaft so that rotation of the transmission shaft can bring the second turnable to rotate; the other end of the second turnable away from the motor is provided with a third bearing, an inner side of the third bearing is connected to the second turnable, and an outer side of the third bearing is connected to the housing;
   wherein the first side wall is provided with a circular bump, the fixing end of the driving assembly is connected on the circular bump; the driving assembly further incudes a motor and a first shell, the motor is arranged inside the first shell, the first shell is fixed on the circular bump, two opposite ends of the motor are provided with a first sealing plug and a second sealing plug respectively, the first shell together with the sealing plugs forms a second sealed accommodating space configured to receive the motor.

2. The electric cleaning device according to claim 1, wherein the first accommodating space is arranged along an axial direction of the cleaning roller, the output shaft of the driving assembly extends along the axial direction of the cleaning roller and is connected to the cleaning roller.

3. The electric cleaning device according to claim 1, further comprising wheels arranged at a bottom of the housing.

4. The electric cleaning device according to claim 1, wherein the first sealing plug is provided with a connecting port communicated with a connecting pipe, the connecting pipe extends to an outside of the housing, the motor is connected to an external power supply through the connecting pipe, the second sealing plug is provided with a through hole, through which an output shaft of the motor extends out of the first shell to connect the output shaft.

5. The electric cleaning device according to claim 4, wherein the connecting pipe extends through the circular bump.

6. The electric cleaning device according to claim 1, wherein the first turnable defines a first limiting slot, and the second turnable defines a second limiting slot, one end of the cleaning roller is engaged in the first limiting slot, and the other end of the cleaning roller is engaged in the second limiting slot.

7. The electric cleaning device according to claim 6, wherein the first turnable is rotatably connected to the circular bump.

8. The electric cleaning device according to claim 7, further comprising a first bearing, wherein the first turnable is rotatably connected to an outer side of the first bearing, an inner side of the first bearing is sleeved on the circular bump.

9. The electric cleaning device according to claim 1, wherein the cleaning roller comprises an inner roller and scouring sponge covered on the inner roller.

10. The electric cleaning device according to claim 9, further comprising a cleaning pipe and a metal piece arranged inside the cleaning chamber, wherein the metal piece is arranged at a top of the cleaning pipe and configured to squeeze the scouring sponge.

11. The electric cleaning device according to claim 10, further comprising a water inlet device arranged above the metal piece and configured to output water to wet the scouring sponge.

12. The electric cleaning device according to claim 10, further comprising a connecting part arranged at an outlet of the cleaning pipe and configured to connect an external suction device.

* * * * *